United States Patent Office 2,800,655
Patented July 23, 1957

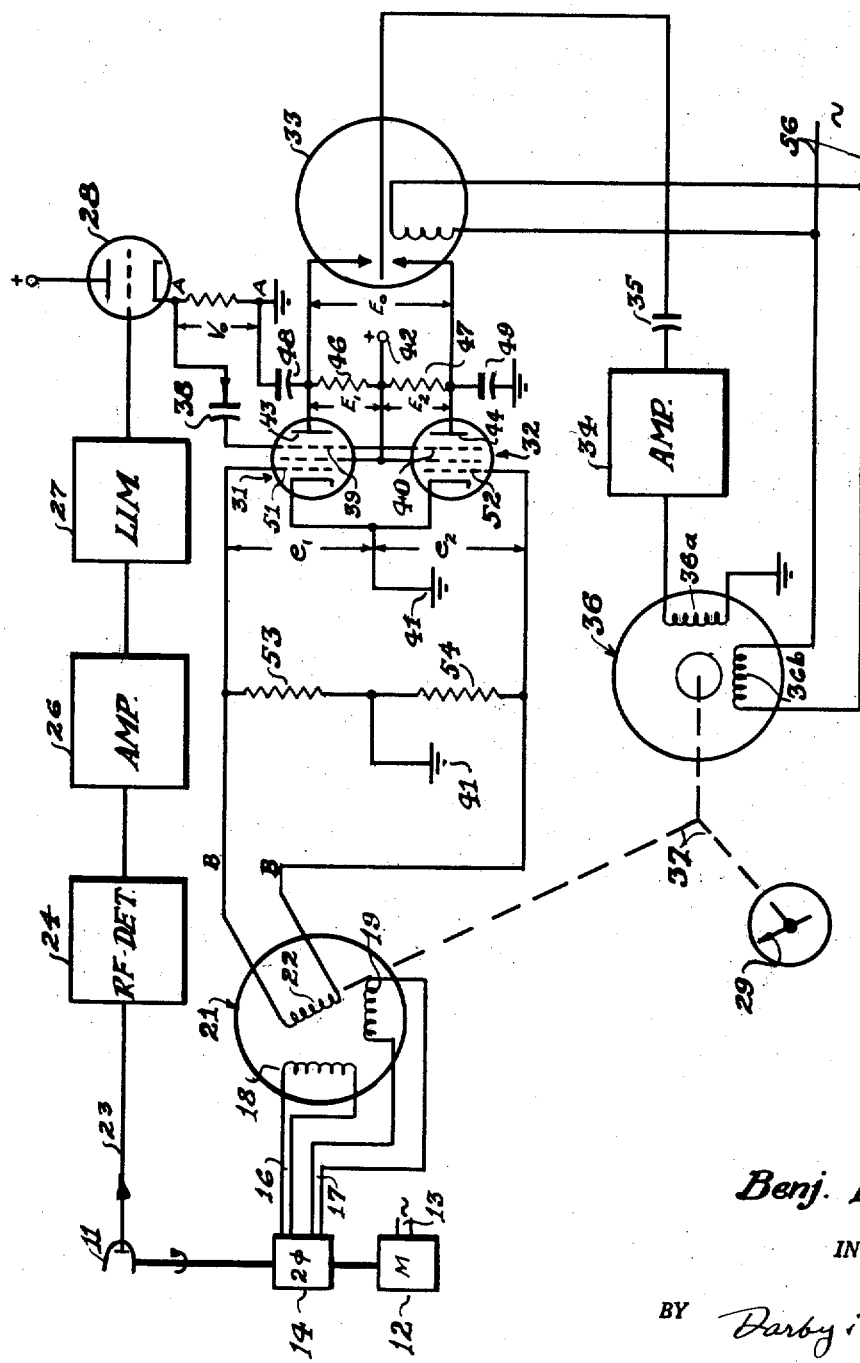

2,800,655

INDICATOR PHASE METER

Benjamin Parzen, Woodside, N. Y., assignor to Olympic Radio & Television Inc., Long Island City, N. Y., a corporation of New York Application June 30, 1954, Serial No. 440,431

6 Claims. (Cl. 343—118)

The present invention is related to the art including phase meters and phase comparator circuits and is particularly directed toward an indicator-type phase meter.

In many situations such as, for example, in certain types of direction finding equipment, it is necessary to indicate the phase of an electrical signal relative to that of a reference signal. In the past, in deriving high accuracy and stability for phase indicators, it has been necessary to accommodate characteristics which are inherently difficult to construct. The present invention provides an electro-mechanical type of indicator phase meter, overcoming the disadvantages of the prior art and providing direct-reading with excellent noise and harmonic-content discrimination and with ample torque for a mechanical indicator, reducing the problem of friction or sticking inherent in other types. Furthermore, complications of input or output torque requirements for the meter are avoided and input signal levels can be made very small, permitting use of precise components.

The present invention provides an indicator phase meter particularly adapted for use in direction-finding systems, although not limited thereto. In such a direction-finding system, a mechanical indicator is driven by a motor and controlled by a servo-amplifier. The motor also drives a phase shifter of precision type which varies the phase of a reference signal. The phase-shifted reference signal and the signal to be indicated are supplied to a special phase detector whose output energizes the servo-amplifier. The motor is operated to actuate both the phase shifter and coupled indicator to seek the null output of the phase detector, which exists when the reference and input signals have quadrature phase relation. The improved phase discriminator used in the present system has inherent noise and harmonic content discrimination, making it highly suitable for use in systems in which the signal to be indicated may have been limited, which provides a very high harmonic content.

Further features and objects of the present invention will become apparent from the appended drawing in which the single figure shows a schematic circuit diagram of a direction-finding system embodying the present invention.

Referring to the drawing, a directional antenna indicated schematically at 11 is continuously rotated by a motor 12 operating at constant speed, and for example, energized from a suitable source of alternating current 13. While antenna 11 is shown as a directional antenna which is physically rotated, it will be understood that any suitable directional antenna system having an effective rotatable directivity pattern may be utilized, including, without limitation, stationary arrays having variable goniometer arrangements, or any other arrangements of stationary or rotating antenna elements providing a rotatable directivity. Coupled to the same shaft as motor 12 and antenna 11, so as to rotate simultaneously therewith, is a two-phase generator 14, having two outputs 16 and 17, which are applied respectively to the stationary field windings 18 and 19 of a continuous phase shifter 21, sometimes called a resolver, which also has a rotatable winding 22. In effect, the resolver 21 by its stationary windings 18, 19 when excited by two-phase currents provides a rotating magnetic field having an axis rotating at the frequency of two-phase generator 14 and hence in synchronism with the antenna 11. The rotor 22 is then excited by this rotating field and the output voltage induced in the rotor 22 by the rotating field and appearing at the rotor terminals will be of the same frequency as the output of generator 14 and with a phase dependent upon the position of the rotor 22.

If it be assumed that the antenna 11, as it continuously rotates, receives a signal from a fixed transmitter or other source at some particular azimuth direction, the signal produced in antenna 11 by that transmitter will be effectively modulated or possibly pulsed at the frequency of rotation of antenna 11 and will have a phase according to the azimuth of the transmitter or source. This signal is passed over a channel 23 to a receiver whose conventional radio frequency and detector stages are indicated schematically by the block 24, the output of block 24 being then the modulation upon the received wave caused by rotation of antenna 11. If, for example, source 13 were a 60 cycle source, and motor 12 were a synchronous motor operating at 3600 R. P. M., generator 14 might also be a 60 cycle two-phase generator and the signal output from receiver block 24 would then be a 60 cycle signal.

This signal is amplified in amplifier 26 and limited to a uniform value in limiter 27. It will be understood that amplifier 26 and limiter 27 may be of any conventional type suitable for performing these indicated functions. The limited signal is then supplied to cathode follower 28, to produce across its output terminals A—A the signal to be indicated.

It will be apparent that the orientation of the source of signal received by antenna 11 (that is, its azimuth) will determine the phase relationship between the received signal at A—A and the outputs 16 and 17 from generator 14. In order to indicate this orientation on a suitable azimuth indicator pointer 29, the signal at A—A and the resolver output at B—B are supplied to a phase-discriminator circuit formed by the tubes 31, 32 to provide a D. C. output $E_0$ having a magnitude and polarity corresponding to the amount and sense of phase difference between the signals at A—A and B—B. This D. C. output is then converted into a corresponding A. C. signal by a synchronous "chopper" 33 coupled through capacitor 35 to a servo-amplifier 34 which in turn energizes a two-phase motor 36 whose rotor is mechanically connected (by any suitable means illustrated schematically by the dotted lines 37) to both the indicator 29 and the resolver rotor 22. The motor 36 thereby rotates the resolver rotor 22 until the discriminator output $E_0$ becomes zero, at which time the indicator 29 registers the orientation of the source of signal received by the antenna.

The discriminator tubes 31, 32 are of the pentode type. The input signal appearing at A—A, which may be designated as $V_0$, is supplied through a coupling condenser 38 cophasally to the suppressor grids 39, 40 of the respective tubes 31, 32. The cathodes of tubes 31, 32 are both grounded at 41. The screen grids of the tubes 31, 32 are connected together and to a source of positive potential indicated at 42. The respective anodes 43, 44 are connected to the source 42 through respective load resistors 46, 47, these anodes 43, 44 being individually bypassed to ground for alternating currents by bypass condensers 48, 49. The signal output from the resolver 21 appearing at terminals B—B is applied in balanced fashion to the control grids 51, 52 of the tubes 31, 32 by means of equal input resistors 53, 54 connected between the respective grids 51, 52 and ground 41.

The manner in which this special discriminator circuit provides the desired output with complete immunity against noise and harmonic effects, is indicated by the following analysis. The plate current of a pentode tube as operated in the present circuit, as experimentally determined, is given by the following equation:

$$i_p = (a + k_1 e_{g_1})(b + k_2 e_{g_2})$$

where $a$, $b$, $k_1$ and $k_2$ are constants of the tube, $i_p$ is the plate current and $$e_{g_1} \quad and \quad e_{g_2}$$

are the potentials of the control and suppressor grids, respectively, as referred to the cathode.

If we let the instantaneous value of the reference voltage at B—B be $e_1$ and the instantaneous value of the signal to be indicated at A—A be $v_0$, then for tube 31 the following equations apply, R being the value of the load resistor 46:

$$i_{p_1} = (a + k_1 e_1)(b + k_2 v_0)$$
$$E_1 = i_{p_1} R = R(a + k_1 e_1)(b + k_2 v_0)$$
$$= Rab + Rak_2 v_0 + Rbk_1 e_1 + Rk_1 k_2 e_1 v_0$$

where $E_1$ is the output voltage across load resistor 46.

Similarly for tube 32, whose control grid voltage is equal to that of tube 31 but of opposite polarity and whose suppressor grid voltage is the same as for tube 31, the following equations apply:

$$i_{p_2} = (a - k_1 e_1)(b + k_2 v_0)$$
$$E_2 = i_{p_2} R = R(a - k_1 e_1)(b + k_2 v_0)$$
$$= Rab + Rak_2 v_0 - Rbk_1 e_1 - Rk_1 k_2 e_1 v_0$$

where $E_2$ is the output voltage across load resistor 47.

However, because of the output connections, the output voltage $E_0$ is the difference between the voltages $E_1$ and $E_2$ across the load resistors 46 and 47, so that $$E_0 = 2Rbk_1 e_1 + 2Rk_1 k_2 e_1 v_0$$

If we now consider average values (indicated by a bar over the pertinent symbol) the average value $\bar{E}_0$ of the output voltage $E_0$ is given by the equations:

$$\bar{E}_0 = \frac{1}{2\pi}\int_0^{2\pi} 2Rbk_1 e_1 d(wt) + \frac{1}{2\pi}\int_0^{2\pi} 2Rk_1 k_2 e_1 v_0 d(wt)$$
$$= \frac{Rbk_1}{\pi}\int_0^{2\pi} e_1 d(wt) + \frac{Rk_1 k_2}{\pi}\int_0^{2\pi} e_1 v_0 d(wt)$$

However, since the input voltages are given by the equations:

$$e_1 = V_1 \sin(wt + \theta)$$
$$v_0 = V_0 \sin wt + f(t)$$

where $w$ is the radian frequency, $\theta$ is the phase shift introduced by resolver 21, and $f(t)$ is that part of the receiver signal comprising white (completely random) noise and other components of frequency different from $$\frac{w}{2\pi}$$

by substituting these values we obtain the following equations for $\bar{E}_0$:

$$\bar{E}_0 = \frac{Rbk_1}{\pi}\int_0^{2\pi} V_1 \sin(wt + \theta) d(wt)$$
$$+ \frac{Rk_1 k_2}{\pi}\int_0^{2\pi} [V_1 \sin(wt+\theta)][V_0 \sin wt + f(t)] d(wt)$$

But $$V_1 \sin(wt+\theta) = V_1 \sin wt \cos\theta + V_1 \cos wt \sin\theta$$

Therefore $$\bar{E}_0 = \frac{Rbk_1}{\pi}\int_0^{2\pi} V_1 \sin wt \cos\theta d(wt)$$
$$+ \frac{Rbk_1}{\pi}\int_0^{2\pi} V_1 \cos wt \sin\theta d(wt)$$
$$+ \frac{Rk_1 k_2}{\pi}\int_0^{2\pi} V_0 V_1 \sin^2 wt \cos\theta d(wt)$$
$$+ \frac{Rk_1 k_2}{\pi}\int_0^{2\pi} V_0 V_1 \sin wt \cos wt \sin\theta d(wt)$$
$$+ \frac{Rk_1 k_2}{\pi}\int_0^{2\pi} V_1 \sin wt \cos\theta f(t) d(wt)$$
$$+ \frac{Rk_1 k_2}{\pi}\int_0^{2\pi} V_1 \cos wt \sin\theta f(t) d(wt)$$

$\theta$, $V_0$ and $V_1$ are constant. Also, all terms involving the integral of $f(t)$ are zero, since the noise factor is essentially random, having zero energy. Also, it is a general trigonometric fact that the definite integrals between 0 and $2\pi$, of $\sin wt$, $\cos wt$ and $\sin wt \cos wt$ are all zero, and the corresponding integral of $\sin^2 wt$ is $\pi$.

Applying these facts to the equation for $\bar{E}_0$, we get $$\bar{E}_0 = Rk_1 k_2 V_0 V_1 \cos\theta$$
$$= K V_0 V_1 \cos\theta$$

where $K = Rk_1 k_2$.

Accordingly, the output of the phase discriminator formed by tubes 31, 32 is proportional only to the cosine of the phase angle between the reference signal and the signal to be indicated, and is independent of the noise factor $f(t)$ and the frequency. In particular, harmonics injected by limiter 27 have no effect. This output is essentially direct current, and by the chopper 33 is converted into an alternating current signal of proportional amplitude and corresponding polarity. Chopper 33 may be any suitable synchronous vibrator, such as manufactured by Oak Manufacturing Company, Stevens-Arnold Corporation, Brown Instrument Corporation, Leeds and Northrup, and many others. While such a chopper has been found to be highly desirable, especially for small input signals, it may be replaced where desired by other circuits suitable for performing this function, namely, to convert a variable-amplitude reversible-polarity direct-current signal into a correspondingly variable-amplitude reversible-polarity alternating current signal; such circuits have sometimes been called modulator circuits.

The output of chopper 33 is supplied through a coupling condenser 35 and conventional servo-amplifier 34 to one winding 36a of motor 36. A second winding 36b of motor 36 is supplied with alternating current from source 56, which also supplies the chopper 33 or its corresponding modulator. In this way, winding 36b is provided with a fixed amplitude signal of the frequency of source 56, while winding 36a is provided with a variable-amplitude reversible-phase signal of the same frequency from the phase discriminator through chopper 33 and amplifier 34. As a result, the motor 36 rotates in a direction corresponding to the polarity of the signal applied to its winding 36a and at a speed determined by the amplitude of that signal. Motor 36 then rotates the rotor 22 of resolver 21 in a sense to reduce the phase difference $\theta$ between the signals at A—A and B—B. When these signals are in phase quadrature (with 90° phase difference therebetween) the output of the discriminator $\bar{E}_0$ will be a null, which will in turn reduce the energization of winding 36a to zero, causing the motor to stop in this position. Since the indicator 29 is also coupled to the motor 36, it will assume a position in direct correspondence with that of the resolver rotor 22, which position is thereby determined by the relative phase between the signal at A—A and the signal provided by generator 14. This position of indicator 29 is therefore representative of the azimuth orientation of the source of signal received by antenna 11.

From the foregoing, it will be seen that the present system provides a highly advantageous indicator-type phase meter especially adapted for use in radio direction-finding but not limited thereto. By the use of pentode tubes 31, 32 in the phase discriminator, a high degree of random noise immunity and immunity from harmonic distortion is obtained. The added feature of the use of limiter 27 makes the discriminator output essentially independent of the waveform and amplitude of the received signal.

It will be understood that the phase discriminator of the present invention is not restricted in its use to the radio direction-finding system in which it has been illustratively described, but may be utilized wherever it is desired to provide an output signal representative of the phase difference between two input signals. For example, any two signals whose phases are to be compared, may be inserted at points A—A and B—B of the phase discriminator circuit whose output E₀ then provides the useful results characteristic of the present phase discriminator.

Also, the resolver is merely one form of phase-shifter, particularly suitable because it produces uniform amplitude output. Other well known forms of adjustable phase-shifter may be employed where desirable. In addition, in the phase discriminator, it is immaterial which signal is applied to the control grid and which to the suppressor grid, and these signals may be interchanged where desired. Similarly, the phase-shifter or resolver may be in circuit with either signal, although preferably employed with respect to the reference signal.

In addition, it is immaterial which of the pentode grids are cophasally excited and which are anti-phasally excited. Where desired, the control grids may be connected together to be cophasally excited by one signal, and the suppressor grids are then separately excited anti-phasally by the other signal.

It is to be understood that the above description is illustrative only of one preferred form of the present invention and that it may assume other and apparently widely differing forms equivalent thereto, the scope of the present invention being defined solely by the appended claims.

What is claimed as the present invention is:

1. A radio direction-finding system comprising a directive antenna, means for continuously rotating the directivity pattern of said antenna, means for generating a two-phase voltage synchronously with the rotation of said pattern, means for receiving and detecting radio signals impinging upon said antenna from a source of radio waves to provide a signal to be indicated, means for limiting said signal to be indicated to a substantially fixed amplitude, a resolver coupled to said voltage-generating means and having means responsive to said two-phase voltage for setting up a magnetic field rotating synchronously with said directivity pattern and having a rotor element with a rotatable output winding in said field, whereby a reference voltage is induced in said winding, a phase discriminator coupled to said rotor winding and also excited by said limited signal to be indicated, said phase discriminator comprising a pair of pentode tubes, each having a control grid, a suppressor grid, and an anode, means supplying one of said reference signal and signal to be indicated cophasally to both said suppressor grids, means supplying the other of said signals in opposite phase to said two control grids, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said reference voltage and said signal to be indicated, means for converting said direct current output signal into an alternating current signal of predetermined frequency having an amplitude and polarity representative respectively of the amplitude and polarity of said direct current output signal, a two-phase motor having a pair of windings, means supplying one of said windings with fixed amplitude energy of said predetermined frequency, means supplying the other of said windings by said latter alternating current signal, means mechanically coupling said motor output to said resolver rotor element, and a mechanical indicator also coupled to said resolver rotor element, whereby said motor rotates said resolver rotor to a null position at which said indicator indicates the orientation of said source of radio waves.

2. A radio direction-finding system comprising a directive antenna, means for continuously rotating the directivity pattern of said antenna, means for generating a two-phase voltage synchronously with the rotation of said pattern, means for receiving and detecting radio signals impinging upon said antenna from a source of radio waves to provide a signal to be indicated, means for limiting said signal to be indicated to a substantially fixed amplitude, a resolver coupled to said voltage-generating means and having means responsive to said two-phase voltage for setting up a magnetic field rotating synchronously with said directivity pattern and having a rotor element with a rotatable output winding in said field, whereby a reference voltage is induced in said winding, a phase discriminator coupled to said rotor winding and also excited by said limited signal to be indicated, said phase discriminator comprising a pair of pentode tubes, each having a control grid, a suppressor grid, and an anode, means supplying one of said reference signal and signal to be indicated cophasally to both said suppressor grids, means supplying the other of said signals in opposite phase to said two control grids, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said reference voltage and said signal to be indicated, a mechanical indicator coupled to said resolver rotor element, and means responsive to said direct current output signal for rotating said element and indicator until said output signal is zero, whereby said indicator indicates the orientation of said radio wave source.

3. A radio direction-finding system comprising a directive antenna, means for continuously rotating the directivity pattern of said antenna, means for generating a two-phase voltage synchronously with the rotation of said pattern, means for receiving and detecting radio signals impinging upon said antenna from a source of radio waves to provide a signal to be indicated, means having a rotatable element and excited by said two-phase voltage for producing a reference signal having a phase representative of the relative angular relationship between the position of said element and a predetermined orientation of said antenna, a phase discriminator supplied with said reference signal and by said signal to be indicated, said phase discriminator comprising a pair of pentode tubes, each having a control grid, a suppressor grid, and an anode, means supplying one of said reference signal and signal to be indicated cophasally to both said suppressor grids, means supplying the other of said signals in opposite phase to said two control grids, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said reference voltage and said signal to be indicated, a mechanical indicator coupled to rotate with said element, and means responsive to said direct current output signal for rotating said element and indicator until said output signal is zero, whereby said indicator indicates the orientation of said radio wave source.

4. A radio direction-finding system comprising a directive antenna, means for continuously rotating the directivity pattern of said antenna, means for producing a voltage of a frequency synchronous with the rotation of said directivity pattern, adjustable phase shifting means for said voltage having an adjustable element for determining the degree of phase shift interposed thereby, said phase-shifting voltage constituting a reference signal, means for receiving and detecting radio signals impinging upon said antenna from a source of radio waves to provide a signal to be indicated, a phase discriminator supplied with said reference signal and by said signal to be indicated, said phase discriminator comprising a pair of pentode tubes, each having a control grid, a suppressor grid, and an anode, means supplying one of said reference signal and signal to be indicated cophasally to both said suppressor grids, means supplying the other of said signals in opposite phase to said two control grids, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said reference voltage and said signal to be indicated, a mechanical indicator coupled to said adjustment element of said phase-shifting means for conjoint movement therewith, and means responsive to said direct current output signal for rotating said element and indicator until said output signal is zero, whereby said indicator indicates the orientation of said radio wave source.

5. An indicator type phase detector circuit for mechanically indicating the phase relation between two signals having like fundamental frequencies but of arbitrary wave shape, comprising means maintaining said two signals at substantially uniform amplitudes, a phase-shifter having an adjustable element determining the degree of phase shift provided thereby, means supplying one of said signals to said phase-shifter to produce a phase-shifted signal, a phase discriminator comprising a pair of multi-grid tubes, each having a first grid, a further grid and an anode, means supplying said other signal cophasally to both said first grids, means supplying said phase-shifted signal in opposite phase to said further girds, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said other signal and said phase-shifted signal, a mechanical indicator coupled to said phase-shifter adjustable element for conjoint movement therewith, and means responsive to said direct current output signal for rotating said element and indicator until said output signal is zero, whereby said indicator indicates the phase difference between said signals.

6. An indicator type phase detector circuit for mechanically indicating the phase relation between two signals having like fundamental frequencies but of arbitrary wave shape, comprising a phase discriminator comprising a pair of multi-grid tubes, each having a first grid, a second grid and an anode, means supplying one of said signals to one pair of said grids cophasally, means supplying the other of said signals to the other pair of said grids antiphasally, a source of positive potential coupled to said anodes through respective load resistors, means bypassing each of said load resistors for alternating current, and a discriminator output circuit coupled to said two anodes for deriving the difference between the average potentials of said anodes, said difference constituting an output direct current signal representative of the phase difference between said signals, phase shifter means for one of said signals having an adjustable element, a mechanical indicator coupled to said phase-shifter adjustable element for conjoint movement therewith, and means responsive to said direct current output signal for rotating said element and indicator until said output signal is zero, whereby said indicator indicates the phase difference between said signals.

References Cited in the file of this patent
UNITED STATES PATENTS 2,698,433     Ringoen  --------------- Dec. 28, 1954